Feb. 2, 1926.

H. R. VAN DEVENTER
ELECTRICAL CONDENSER
Filed June 25, 1923       2 Sheets-Sheet 1

1,571,501

Inventor
Harry R. Van Deventer

Feb. 2, 1926.  1,571,501
H. R. VAN DEVENTER
ELECTRICAL CONDENSER
Filed June 25, 1923    2 Sheets-Sheet 2

Inventor
Harry R. Van Deventer

Patented Feb. 2, 1926.

1,571,501

UNITED STATES PATENT OFFICE.

HARRY R. VAN DEVENTER, OF NEW YORK, N. Y., ASSIGNOR TO DUBILIER CONDENSER & RADIO CORPORATION, OF NEW YORK, N. Y., A CORPORATION OF DELAWARE.

ELECTRICAL CONDENSER.

Application filed June 25, 1923. Serial No. 647,682.

*To all whom it may concern:*

Be it known that I, HARRY R. VAN DEVENTER, a citizen of the United States, residing at New York, in the county of New York and State of New York, have invented certain new and useful Improvements in Electrical Condensers, of which the following is a specification.

This invention relates to improvements in electrical condensers and more particularly to a method of constructing condensers as commonly used in radio apparatus and the like where the condenser must be small, compact and of high efficiency. It is necessary to secure high efficiency in such condensers and that they be constructed of mica. It has heretofore been difficult to construct such condensers at a reasonable cost, which, however, this invention makes it possible to do.

One object of the present invention is to provide a condenser in which all of the insulating material may be mica, thereby eliminating the electrical losses taking place when other insulating materials are used, although other insulating material such as paper may be employed if desired.

Another object of the invention is to provide a construction in which all of the parts of the condenser may be punched or otherwise cheaply formed by machine operations, and hand assembly reduced to a minimum.

A further object is to provide a condenser with integral terminal clips or members so arranged that a plurality of condensers may be connected together without the necessity of extra connecting clips or members.

A further object is to provide a condenser which may be readily supported or mounted, and wherein the same terminal mounting clip or clips for the condenser will also serve as the mounting clip or clips for one or more resistance units or "grid leaks" or the like as often employed with condensers.

There are other objects which will more fully hereinafter appear.

In the accompanying drawings.

Circular condensers have never come into extended use on account of the difficulties that have heretofore existed in connection with their construction. Circular condensers of the prior art may be exemplified by the United States patent to Denieport No. 934,714 dated September 21, 1909. A study of the said patent will show that the construction of circular condensers was attempted by taking a number of mica and foil discs and placing them in a housing provided with terminals connected to the two sets of foil discs forming the plates of the condenser. No provision was made to utilize the casing as a terminal for the plates in contact therewith, but extra binding posts were employed. Condensers of this type required that insulation be placed in and around the central stem which makes the condenser unsuitable for high voltage circuits. No provision was made in these condensers for applying heavy pressure whereby electrical losses are reduced, and relatively high capacity obtained in a very small space. It is well known that the only efficient condensers for high frequency and high voltage circuits such as is met with in radio work, are those in which the plates are securely held under heavy pressure, thereby eliminating all air pockets in the condenser plates, which cause serious losses. Such pressure also causes intimate contact between the mica and foil plates, which further reduces losses.

Figure 1:
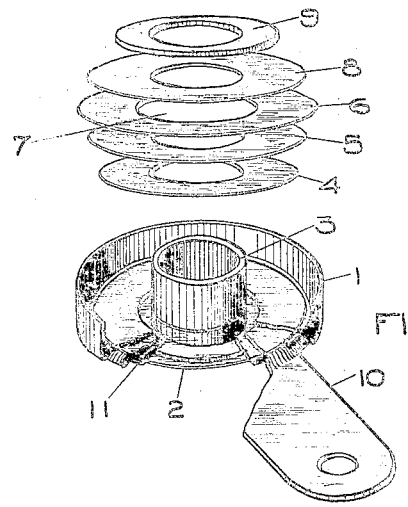
Figure 1 is a view, partly in section, showing my improved condenser.
Figure 2:
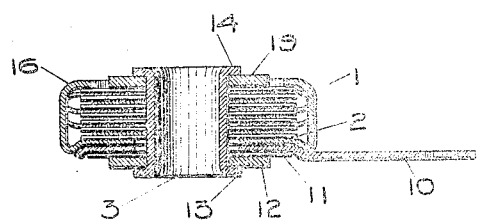
Figure 2 is a sectional view of the assembled condenser of Figure 1.
Figure 3:
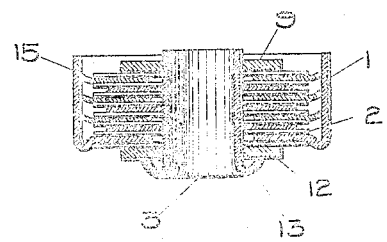
Figure 3 is a sectional view of the condenser of Figure 1 at right angles to Figure 2.

The construction shown in Figures 1 to 4 eliminates the foregoing and other difficulties heretofore met with in the construction of these circular condensers. Referring to Figure 1, 1 denotes an outer casing having initially, a straight upwardly projecting side wall and forming an open cup as shown in Figure 3.

Within this cup is assembled the main body of condenser plates. First, there is laid down in the bottom of the cup a mica disc or sheet 2 having a central aperture adapted to fit over the tubular rivet 3. Upon this disc 2 is placed a piece or sheet of foil 4 having a central aperture adapted to fit snugly around rivet 3 and thereby maintain electrical contact therewith. Upon the foil 4 is placed a piece of mica 5, similar in all respects to mica disc 2, and upon 5 is placed a piece of foil 6, the outer edge of which is in contact with the metal cup or casing 1. The central aperture in foil 6 denoted by the numeral 7, is sufficiently large so that 6 does not come in contact with the rivet 3. Upon 6 is placed a piece of mica 8 which is in all respects similar to 2.

It will now be observed that any number of mica and foil plates may be built up to form the condenser body or stack, and that half of the foil plates will be in contact with the metal case or cup 1, and the remaining plates will be in contact with the rivet 3. When the stack is finally complete, a heavy washer 9 is placed upon the top of the stack.

The terminal lug 10 is placed on the condenser in metallic contact with cup 1, mica disc 11 is placed between 10 and the heavy washer 12. The rivet or member 3 has a turned over portion shown by 13 adapted to grip the washer 12. The condenser at this stage of the assembly is as shown in Figure 3. The condenser may now be taken to any suitable device, such as a small arbor-press, and pressure is applied to the top of the tubular rivet 3 so as to cause the ends 13 and 14 thereto to flare out and securely engage and compress all of the mica and foil discs between the heavy washers or plates 9 and 12. The condenser is at the same time, by any suitable means, heavily compressed so as to bring all of the mica and foil sections into close contact. At the same time preferably, the upwardly projecting edge, indicated by the numeral 15, Figure 3, may be spun or otherwise pressed inwardly as indicated by the numeral 16, Figure 2, thereby engaging and compressing the outwardly extending edges of the mica and foil discs, and particularly compressing and securing good contact with, the outwardly extending edges of the foil sheets that are intended to be in contact with the cup or casing 1.

It will now be observed that the condenser is complete so far as its mechanical construction is concerned, that half of the plates thereof are in permanent electrical contact with the outer casing 1 which in turn is in electrical contact with the projecting lug 10, and the remaining plates are in contact with the rivet 3, so that the condenser may be connected in circuit by means of a suitable screw or binding post through the tubular rivet 3 and a similar suitable post through the hole in lug 10.

By reason of the central stem and outer casing being spun over the condenser stack or group of insulating and foil plates as previously described, the said plates are permanently held under heavy pressure and cannot shift or change their position.

All air spaces are eliminated within the body of the condenser. For the sake of clearness, I have shown the elements of the condenser in the figures as separated, but it will be understood that in practice, when the case is spun into final position, such spaces are eliminated, particularly as I prefer to impregnate the condenser with wax or a similar compound under vacuum and heavy pressure which in a well known manner fills all interstices.

Figure 4:
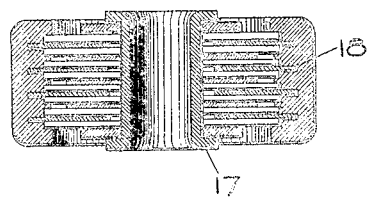
Figure 4 is a sectional view of the condenser having certain parts moulded.

Figure 4 shows an alternative form of construction in which the tubular rivet or member denoted by the numeral 17 and the outer cup or casing 18 may be cast into position about the mica and foil plates of the condenser. When this form of construction is used, the mica and foil plates are assembled to form a stack, in any suitable form or jig that will hold them in correct relative position during the period of assembly. A guide pin is then thrust through the center of the condenser stack, and the stack is placed in a suitable die casting machine. While the condenser stack is held under pressure, the tubular rivet 17 and the casing 18 are cast about the plates, using any suitable metal, preferably an alloy with a low melting point. I find that this operation insures very good contact between the plates projecting inwardly and arranged to contact on 17, and the outer edges of that group of plates intended to contact with the outer casing 18.

Figure 5:
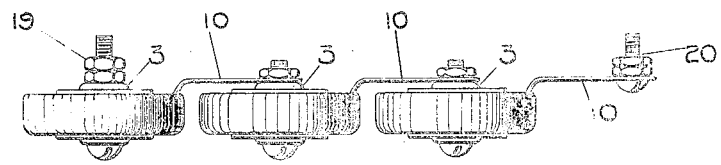
Figure 5 is a view showing three condensers connected in series.

Referring to Figure 5, the advantages of the construction wherein the center rivet 3 forms one terminal of the condenser and the projecting lug 10 the other, will be evident. The three condensers shown in the figure are in series.

The terminal screw 19 is connected to the rivet 3; lug 10 connects the terminal 3 of the next condenser, and so on, for any number of condensers, the final terminal of the series consisting of the screw and nut 20 placed at the end of the last projecting lug 10. It will be seen that the condensers may be readily connected in series or in multiple or in series-multiple, and by having comparatively few condensers of different capacities and then grouping them, that an almots infinite number of capacity values can be obtained.

Figure 6:
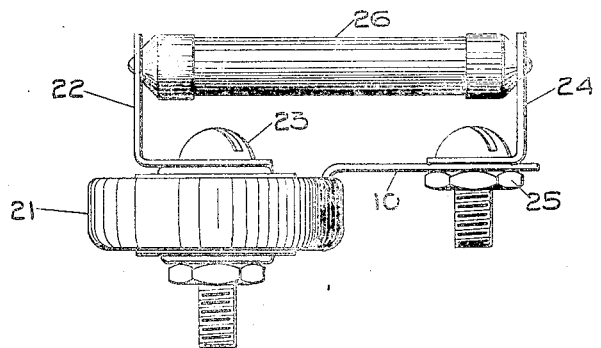
Figure 6 is a view of the condenser having mounted thereon a grid leak or other device.

In many electrical circuits these condensers are used in conjunction with other apparatus. This is particularly true in radio receiving sets where the condensers are quite often used with resistance units commonly referred to as "grid leaks". Figure 6 shows how these condensers may be used with other devices such as grid leaks to form a unit structure. This is accomplished by providing the condenser which is as a whole shown by the numeral 21, Figure 6, with an upwardly projecting clip 22 secured to the rivet 3 by means of a screw 23. The lug 10 of the condenser is provided with a clip 24 secured thereby by screw and nut 25; between the clips 22 and 24 is mounted the grid leak or other device 26, and it will be observed that this device 26 and its supporting clips 22 and 24 form with the condenser 21 a unitary structure which may be sold and mounted as a unit.

Figure 7:
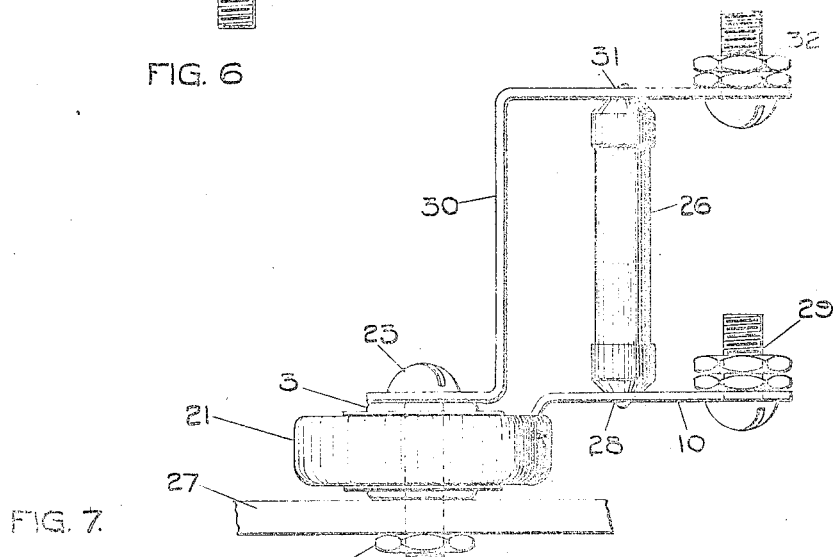
Figure 7 is an alternative form of mounting for the grid leak or other device, and also showing how the condenser may be mounted upon a fixed support.

Figure 7 shows how the unitary structure just referred to may be mounted, and this figure also shows a slightly different arrangement of the terminals for the grid leak or other device 26. In Figure 7, 27 denotes a base or support such, for instance, as the mounting panel of a radio receiving set. The screw 23 passing through the tubular rivet 3 mounts the condenser (which as a whole is indicated by 21), upon the support 27. The lug 10 of the condenser is perforated at 28 to receive one terminal of the device 26. This lug is also provided with a circuit terminal of any suitable form such as the screw and nut 29. The clip 30 supports the other end of 26, in the perforation at 31, and is provided with the terminal screw 32. By this arrangement I provide a unitary structure having circuit terminals 29 and 32, which connect to the grid leak or other device 26 and the condenser 21. At the same time an additional circuit connection may be made to the terminal 33, if desired.

The casing 1 or the casing 18 is really in effect a ring forming a reinforcing rim or border encompassing the periphery of the condenser and engaging the upper and lower faces thereof adjacent the periphery to maintain presure upon the adjacent portions of the sheets of mica and foil which make up the body of the condenser; and the tubular member 3 passing through the body of the condenser within the compass of the ring or casing also serves to maintain pressure upon the sheets of metal foil and mica by having its opposite ends expanded or flared for this purpose.

I claim:

1. A condenser comprising a body containing sheets of electrically conductive material separated by sheets of dielectric, a ring extending around the periphery of said body and engaging portions of the opposite faces of the condenser adjacent said periphery to maintain said sheets under compression, said body having an aperture therethrough, and a tubular member passing through said aperture and having its extremities outside of the body of the condenser shaped to maintain compression upon said opposite faces and thus hold said sheets in firm engagement, part of the sheets of conductive material being electrically connected inside the condenser directly to said member.

2. A condenser comprising a body made up of sheets of electrically conductive material separated by sheets of dielectric, a ring encompassing the periphery of said body and engaging portions of the opposite faces thereof adjacent said periphery to maintain said sheets under compression, said body having an aperture therethrough, a tubular member passing through said aperture and having its extremities outside the body of the condenser expanded, part of said sheets of conductive material being connected inside of the condenser directly to said member, and relatively thick plates upon the opposite faces of the condenser, said plates having perforations to receive the extremities of said member and be secured thereby in position against the opposite faces of the body of the condenser.

3. A condenser comprising a body made up of sheets of electrically conductive material separated by sheets of dielectric, a ring encompassing the periphery of said body and engaging portions of the opposite faces of said condenser adjacent said periphery to maintain said sheets under compression, said body having an aperture at the center thereof, and a tubular member passing through said aperture and having its extremities outside of the body of the condenser shaped to maintain compression upon said opposite faces and thus hold said sheets in firm engagement with one another, part of said conductive sheets being electrically connected inside the condenser directly with said member, and part of said conductive sheets being electrically connected to said ring.

4. A condenser comprising a body made up of sheets of electrically conductive material separated by sheets of dielectric, a ring encompassing the periphery of said body and engaging portions of the opposite faces thereof adjacent said periphery to maintain said sheets under compression, said body having a central aperture therethrough, a tubular member passing through said aperture and having its extremities outside the body of the condenser expanded, part of said conductive sheets being connected inside the condenser directly to said member, and part to said ring, and relatively thick plates upon the opposite faces of the condenser, said plates having perforations to receive the extremities of said member and be secured thereby in position against the opposite faces of the body of the condenser.

5. A condenser comprising a body made up of sheets of electrically conductive material separated by sheets of dielectric, said body having an aperture therethrough, a tubular member passing through said aperture and having its ends outside said body expanded to compress the body, part of said conductive sheets being connected to said member, and a terminal lug having one end perforated to encircle said member, and held against the body, the adjacent expanded end of said member securing said lug in position.

6. A condenser comprising a body made up of sheets of electrically conductive material separated by sheets of dielectric, said body having an aperture therethrough, a tubular member passing through said aperture, relatively thick plates upon the opposite faces of the condenser, said plates being perforated to receive the ends of said member, the extremities of said member outside of said body being expanded against said plates to secure same in position against the opposite faces of the body of the condenser, part of said conductive sheets being electrically connected to said member, and a terminal lug having one end encircling said member and being held against the body, the adjacent expanded end of said member securing said lug in position.

In testimony whereof I affix my signature.

HARRY R. VAN DEVENTER.